March 22, 1966 E. D. ALDERSON 3,241,313
THRUST DEFLECTOR
Filed Sept. 18, 1963 2 Sheets-Sheet 1
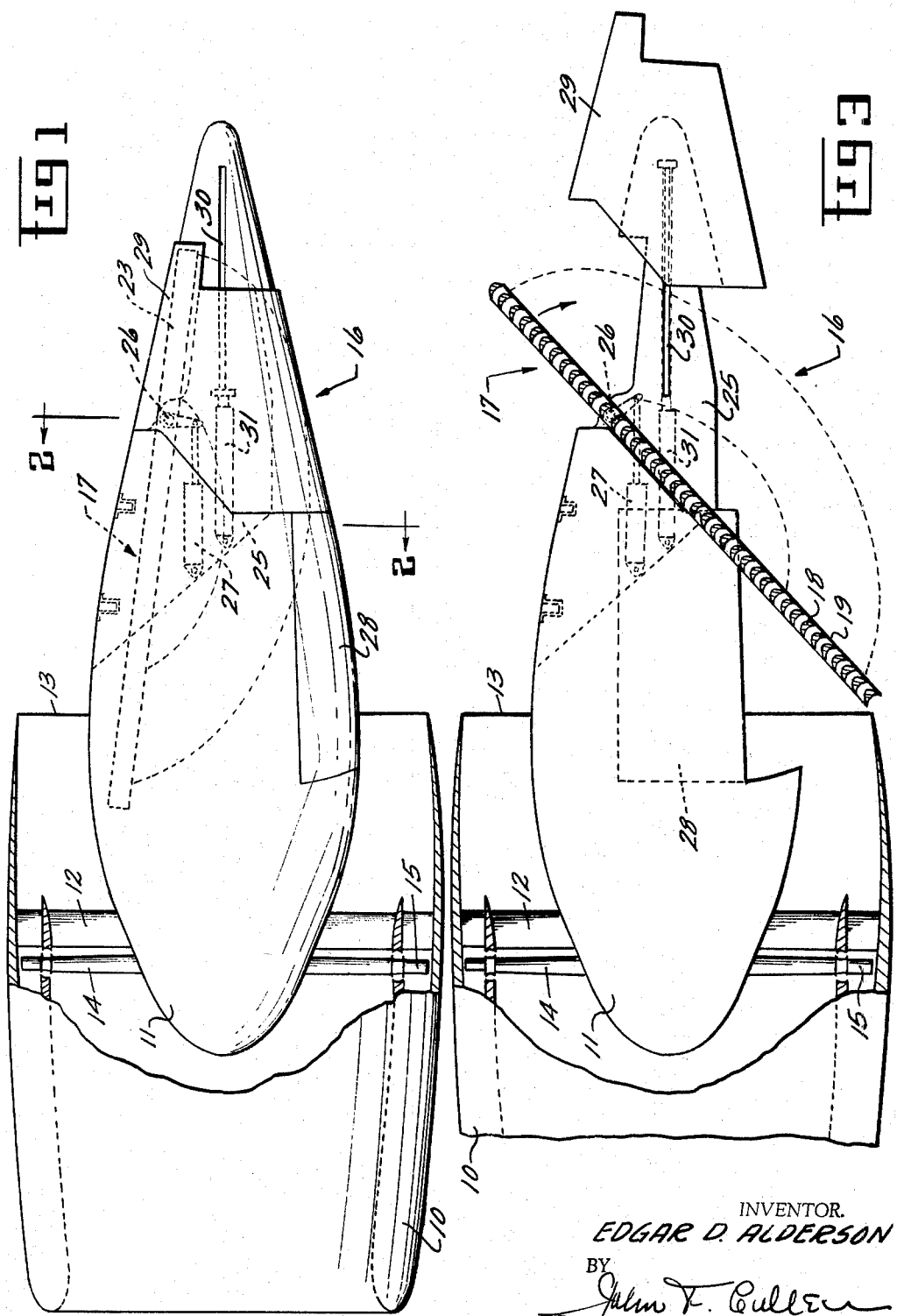
INVENTOR.
EDGAR D. ALDERSON
BY
ATTORNEY March 22, 1966  E. D. ALDERSON  3,241,313
THRUST DEFLECTOR
Filed Sept. 18, 1963  2 Sheets-Sheet 2
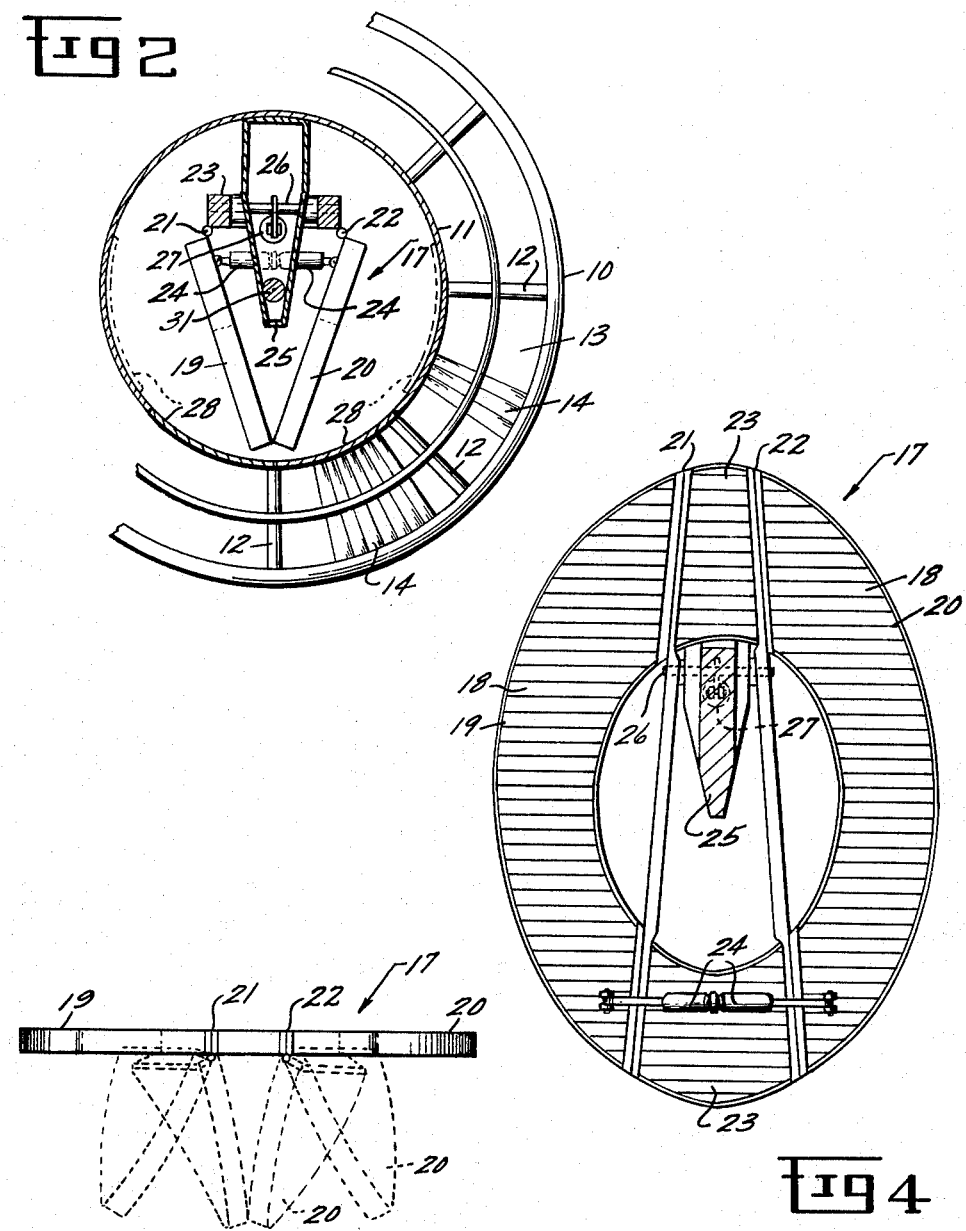
INVENTOR.
EDGAR D. ALDERSON
BY
ATTORNEY

United States Patent Office 3,241,313
Patented Mar. 22, 1966

3,241,313
THRUST DEFLECTOR
Edgar D. Alderson, Cincinnati, Ohio, assignor to General Electric Company, a corporation of New York
Filed Sept. 18, 1963, Ser. No. 309,689
10 Claims. (Cl. 60—35.54)

The present invention relates to a thrust deflector, and more particularly, to a thrust deflecting means for use in a cruise fan type powerplant. Additionally, means for reversing the thrust is also disclosed.

A typical powerplant considered for aircraft propulsion is that type known as a cruise fan. Generally, this is a powerplant in which a central member, such as a plug, may carry a large fan at its forward end and the fan in turn, is surrounded by an outer shroud or barrel-like member through which air is pumped by the fan to produce thrust. Conveniently, the fan may be of the tip turbine type where turbine buckets are mounted on the end of the fan blades and driven by exhaust gas from a gas generator that may be located elsewhere. Such powerplants are highly efficient and move large quantities of air at lower velocities. Additionally, in any aircraft employing such powerplants, it is desirable to provide lift on the aircraft and this may be done by rotating the whole engine, be it a jet engine or a cruise fan engine, in a well known manner. Also, the exhaust stream may be deflected downwardly without actually rotating the engine. The difficulty with rotating a cruise fan in its nacelle is that cruise fans are generally quite large both in diameter and length. Rotation is impractical since the powerplant might strike the ground or the exhaust might issue so close to the ground that undesirable back pressure effects are produced. Additionally, rotation requires very large actuation forces. Therefore, a more practical means of obtaining vertical lift from such a powerplant is to divert or deflect the fan stream downward. The cruise fan is different from an ordinary jet engine in that it is a low pressure ratio device and is quite sensitive to back pressure. That is, if blockage is imposed behind the fan to turn or deflect the flow downward, the back pressure on the fan is increased and it will operate inefficiently and result in a performance loss.

The most effective way to turn the flow is through a cascade of louvers which do not produce much back pressure and can operate on a free stream. A cascade can thus turn the flow without any appreciable pressure drop. Such a cascade merely consists of a series of preferably airfoil louvers that may be fixed in a frame or may be made to rotate within the frame. Generally cascades are well known.

Cruise fans are generally quite large in diameter, as previously noted, in order to move a large mass of air at low velocities. Consequently, injecting a cascade across the cruise fan exhaust creates a problem of what to do with it when deflected thrust is not desired. In other words, during the cruise mode the cascade must be stowed out of the way in a practical manner. In operation, it must intercept the stream at an angle, for example 45°, which in conjunction with the camber of the individual louvers, may deflect the flow 90° or more downward with little pressure change across the fan. Additional turning beyond 90° by different camber or movable louvers, as well as a different angle of the whole cascade frame, may provide thrust reversing in a cruise fan.

The primary object of the present invention is to provide a thrust deflector of the type described which may be easily stowed within the confines of the structure present in the jet propulsion powerplant.

Another object is to provide a thrust deflector which may turn all the flow or only part of the flow in intermediate positions to thus vector the thrust.

A further object is to provide a deflector that may be used for reversing the thrust.

Another object is to provide a balanced system wherein the aerodynamic loads tend to assist the deflector in its operating condition.

Briefly stated, the invention is directed to a thrust deflecting means for use in a jet propulsion powerplant which has an outer shroud and a centerbody such as a plug with a recess therein. The recess generally opens downwardly and rearwardly and the centerbody or plug is disposed centrally of the shroud and extends downstream from the shroud to form an annular nozzle with the shroud for the passage of thrust fluid. The thrust deflecting means in this powerplant comprises a louvered cascade which forms an ellipse in plan view and whose plane intersects the fluid or deflection downwardly by the louvers. The cascade is divided into at least three segments of two outer wing members which pivot along a generally longitudinal line to a central segment. A support member is provided in the centerbody or plug and the central segment is pivotally connected to the support member on an axis transverse to the wing member pivots. Actuation means of any suitable type is provided to rotate the wing members toward each other and then rotate all the segments into the recess for stowage within the centerbody or plug. Additionally, suitable closing means, such as doors and a translating sleeve, may be appropriately mounted to close the opening in the centerbody when the cascade is in stowed condition.

While the specification concludes with claims particularly pointing out and distinctly claiming the subject matter which is regarded as the invention, it is believed the invention will be better understood from the following description taken in connection with the accompanying drawing in which:

FIG. 1 is a cross-sectional view of a typical powerplant showing the thrust deflecting means in phantom in stowed condition;

FIG. 2 is a view taken on line 2—2 of FIG. 1;

FIG. 3 is a view similar to FIG. 1 showing the thrust deflector in operating condition with its plane intersecting the motive fluid;

FIG. 4 is a plan view of the cascade looking into the deflected exhaust opening of FIG. 3 and;

FIG. 5 is a schematic view of the cascade wing members in several positions including an intermediate position for thrust vectoring.

Referring first to FIG. 1 there is shown a general arrangement of a plug nozzle type cruise fan powerplant. It should be understood that the invention is not confined to such a powerplant but, for ease of illustration and description, is described in connection with such a jet propulsion powerplant. Such a cruise fan may consist of a barrel-like shroud member 10 to form an air intake as the powerplant is moved through the air. In order to accelerate the air and exhaust it through a nozzle to provide thrust, there is provided a centerbody 11, preferably in the shape of an aerodynamic plug, which is disposed and supported centrally of the shroud by any suitable means such as struts 12. As shown, the plug is designed to extend downstream of the shroud to form an annular nozzle 13 therewith. The throat of the nozzle may be varied to change the thrust. In order to accelerate the air through the shroud and nozzle, a fan 14 may be carried within the shroud on the forward end of the plug. This fan may conveniently be a tip turbine fan of the type that is well known in the art and is driven by exhaust gas acting on turbine buckets 15 and then exhausting into the nozzle. A gas generator, not shown, may provide the driving fluid for turbine buckets 15. A fan of the general type shown in U.S. Patent No. 3,033,492 is the type contemplated in the instant invention with the extension of the centerbody or plug 11 downstream to provide the nozzle 13 as described.

As previously stated, the cruise fan type of powerplant described is quite large in diameter—perhaps eight feet or more—and may be two to three times that long. Consequently, it is a large structure to rotate when vertical thrust is desired. The powerplant may be supported from pylons on the wing or mounted from the fuselage as shown in the referenced patent as well as other ways known in the art. Regardless of its location or mounting, it is desired to obtain vertical lift from the powerplant by deflecting the thrust of the fluid flow therethrough which fluid consists of the ambient air through shroud 10 as well the exhaust gases exiting from turbine buckets 15. Because of the difficulty of rotating such a large powerplant it is necessary to interject a deflecting means in the motive fluid stream. With the powerplant shown there is a convenient element available to store such deflecting means and that is in the plug 11. To this end, the plug has a recess, generally indicated at 16 which opens rearwardly and downwardly. In other words, the plug is generally hollow with an opening 16 downward and rearward. The plug 11 is thus intended to perform the dual purpose of providing an aerodynamic body for the fluid flow over it as well as a stowage member for the thrust deflecting means to be described.

In order to deflect the fluid flow through the powerplant, there is provided a thrust deflecting means comprising a louvered cascade generally indicated at 17 and best seen in FIG. 4. This is designed to divert the fluid flow beyond the throat of the nozzle 13 to provide maximum lift. As shown in FIG. 4, the louvered cascade 17 forms an ellipse in plan view, and includes a series of individual louvers 18 having a suitable camber for turning the fluid flow in the downward direction. The ellipse is generally in the shape of a ring as shown in FIG. 4. In operating position, as shown in FIG. 3 the plane of the ellipse intersects the motive fluid for deflection downwardly by the louvers 18. The camber of the individual louvers as well as the plane of intersection of the cascade with the motive fluid will determine the angle of downward thrust. Reverse thrust may be obtained by angling the fluid forwardly of the vertical. The louvers may be preferably fixed in a designed position for the particular powerplant or they may be movable in the cascade as is well known, such as is shown in copending application Serial No. 294,049 filed July 10, 1963, now U.S. Patent No. 3,172,621, and assigned to the assignee of the instant invention, in order to vector the thrust including reversing the thrust.

In order to stow the cascade for the cruise operation shown in FIG. 1, the cascade is divided into at least three segments as shown in FIG. 4, including two outer wing members 19 and 20. For folding and subsequent stowage, each wing member is pivoted along longitudinal axes members 21 and 22 which connect with end pieces to form central segment 23. In order to stow all the segment members within the central plug and still provide the open ellipse of FIG. 4 larger than the plug for thrust deflection, wing members 19 and 20 fold toward each other along their axes 21 and 22 respectively by any suitable actuating means 24. In FIG. 4 wings 19 and 20 thus fold up toward each other.

In order to support the cascade, plug member 11 is provided with a suitable supporting strut 25. The cascade is carried on this strut by a pivot means 26 which supports the central segment 23 on the strut transversely to the longitudinal direction. For stowage, any suitable actuating means 27, such as a bellcrank to rotate the cascade in a clock-wise direction is shown by the arrow in FIG. 3. For balance, pivot 26 is located so that rotation of the folded cascade into its central recess within plug 11 does not require a large force. In other words, the cascade is balanced since the fluid flow in FIG. 3 creates balanced turning moments on the cascade.

As thus far described, it will be seen that wing members 19 and 20 are first folded along axes 21 and 22, respectively, and then all the segments are rotated about pivot 26 into a stowed condition within plug 11. Since the wing members are carried by the central segment 23, rotation of this segment by actuator 27 rotates all the folded segments into the recess for stowage within the plug. With the structure described, it will be apparent that the cascade stows in the cool portion of the fluid flow thus obviating the structure and problems associated with high temperatures. Also, in operation, when intercepting the fluid flow, it can be seen that the hot exhaust gases as well as the fan flow are intercepted. Thus, all the fluid flow, hot and cold, is intercepted.

Referring next to FIG. 5, several positions of the wing members are diagrammatically shown. In the open position the fluid flow is all deflected as in FIG. 3. Partially rotating the wing members such as 20, to the intermediate position shown results in part of the fluid flow through the nozzle being intercepted and the remainder passing to the rear. The resultant thrust is between the vertical lift and the cruise position thus permitting the thrust to be vectored depending on the position of the wing members and how much of the fluid flow they intercept and direct downward. In the closed or cruise position shown in FIG. 5, all of the fluid flow is directed to the rear of the powerplant for thrust in the cruise or horizontal position and the segments are stowed.

The folding and rotation of the cascade segments requires use of the plug recess 16 opening. Thus, means for closing such opening are necessary to provide an aerodynamic smooth plug in the cruise position as shown in FIG. 1. Such means is conveniently made in two parts consisting of doors 28, which may be of the bomb-bay type and are rotatable from a closed solid line position to a dotted line position within the centerbody or plug 11 as shown in FIG. 2. Additionally, a hollow sleeve-like member 29 may also be provided as shown in FIG. 1 in closed position. This may take the form of a hollow truncated cone member suitably shaped to fit the configuration of the opening it must close. Movement or translation of sleeve member 29 may be obtained in a number of ways. For purposes of illustration supporting strut 25 may be provided with a longitudinally extending track and slot means 30. Sleeve member 29 is provided with a suitable actuating means 31 to move it longitudinally on said track to telescope or slide over the downstream end of the stowed segments from the open position shown in FIG. 3 to the closed position shown in FIG. 1. In this position of closing the remaining portion of the recess, in conjunction with doors 28, plug 11 is aerodynamically smooth surfaced for cruise operation. It is to be noted that the hollow sleeve member 29, when open as shown in FIG. 3, offers little resistance to the rearward flow of fluid when the wing members are in intermediate position to vector the thrust. In its extended or open position over the downstream end of the plug 11, shown dotted in FIG. 3, the hollow sleeve permits the fluid to pass directly through it and to the rear.

The ring shape of the cascade, shown in FIG. 4, provides a center portion or space in which the supporting strut 25 and actuating means 27 and 31 may be located.

It will thus be apparent that the cascade of the invented combination provides the diverting necessary for lift. Also, reverse thrust is obtainable. Depending on the individual louvers, their camber, and whether they are fixed or movable and the wing members, thrust vectoring may be obtained. For diverting for lift, the whole cascade structure, when open, is larger than the plug in which it is stowed. Stowage, during cruise operation is obtained by folding the cascade into the plug and closing the openings therein. The whole provides a compact device that offers substantially no resistance in cruise operation and has all the advantages of a cascade structure.

While there have been described preferred forms of the invention, obvious modifications and variations are possible in light of the above teachings. It is therefore to be understood that within the scope of the appended claims, the invention may be practiced otherwise than as specifically described.

I claim:

1. In a jet propulsion powerplant having an outer shroud and a centerbody with a recess therein opening downwardly and rearwardly, said centerbody being disposed centrally of said shroud and extending downstream thereof to form an annular nozzle therewith for the passage of thrust fluid therethrough, thrust deflecting means comprising,
   louvered cascade means forming an ellipse in plan view and whose plane intersects said fluid for deflection downwardly by said louvers,
   said cascade being divided into at least three segments of two outer wing members and a central segment, said wing members having a pivot along a longitudinal line to said central segment,
   a support member in said centerbody,
   means pivotally connecting said central segment to said support member on an axis transverse to said wing member pivots,
   means to pivot said wing member segments to fold toward each other,
   and means to pivot all said folded segments into said recess for stowage within said centerbody.

2. Apparatus as described in claim 1 having closing means supported on said centerbody movable to close said recess and continue the surface of said centerbody when said segments are in stowed position.

3. Apparatus as described in claim 2 wherein said closing means includes a pair of doors rotatable in said centerbody to close the downwardly opening part of said recess and a hollow sleeve-like member supported on said support member and movable to close the remaining portion of said recess.

4. Apparatus as described in claim 3 wherein said sleeve-like member is a hollow truncated cone,
   longitudinally extending track members carried by said support member,
   and means connected to said cone to move it longitudinally to telescope over the downstream end of said stowed segments.

5. In a plug nozzle jet propulsion powerplant of the cruise fan type having an outer shroud and a hollow central plug with a recess therein opening downwardly and rearwardly, said plug being disposed centrally of said shroud and extending downstream thereof to form an annular nozzle and having a tip turbine fan carried thereon for movement of thrust fluid through said nozzle, thrust deflecting means comprising,
   cascade means forming an ellipse in plan view and having louvers therein, the plane of said ellipse intersecting said thrust fluid downstream of said nozzle for deflection downwardly by said louvers,
   said cascade being divided into three segments including two outer wing members and a central segment, said wing members each pivoted to the central segment along spaced longitudinal axes,
   a supporting strut in said plug,
   transverse pivot means supporting said central segment on said strut,
   means to pivot said wing members to fold toward each other,
   and means connected to said central segment to pivot all said folded segments into said recess for stowage within said plug.

6. Apparatus as described in claim 5 wherein said louvers are fixed in said cascade at an angle to deflect said fluid downwardly and forwardly to provide reverse thrust.

7. Apparatus as described in claim 5 wherein said louvers in said cascade are movable to vary the direction of flow of fluid therethrough.

8. Apparatus as described in claim 5 having closing means supported on said centerbody and movable to close said recess and continue the surface of said plug when said segments are in stowed position.

9. Apparatus as described in claim 8 wherein said closing means includes a pair of doors rotatable in said plug to close the downwardly opening part of said recess and a hollow sleeve-like member supported on said strut and movable to close the remaining portion of said recess.

10. Apparatus as described in claim 9 wherein said sleeve-like member is a hollow truncated cone,
    longitudinally extending track and slot means on said strut,
    and means connected to said cone to move it longitudinally to telescope over the downstream end of said stowed segments.

References Cited by the Examiner

UNITED STATES PATENTS

| 2,681,548 | 6/1954 | Kappus | 60—35.54 |
| 2,929,580 | 3/1960 | Ciolkosz | 244—12 |
| 2,932,164 | 4/1960 | Watson | 60—35.54 |
| 2,947,501 | 8/1960 | Flint. | |
| 2,967,028 | 1/1961 | Ganger | 244—23 |
| 3,016,700 | 1/1962 | Howald | 60—35.54 |
| 3,028,121 | 4/1962 | Klapproth | 244—23 |
| 3,035,792 | 5/1962 | Klapproth | 60—35.54 X |
| 3,040,524 | 6/1962 | Kurti | 60—35.54 |
| 3,087,303 | 4/1963 | Heinze et al. | 60—35.55 |

FOREIGN PATENTS

| 913,312 | 12/1962 | Great Britain. |
| 922,645 | 4/1963 | Great Britain. |

MARK NEWMAN, *Primary Examiner.*

A. L. SMITH, *Assistant Examiner.*